(12) United States Patent
Baumeister et al.

(10) Patent No.: US 10,539,166 B2
(45) Date of Patent: Jan. 21, 2020

(54) FASTENING ELEMENT

(71) Applicant: BJB GmbH & Co. KG, Arnsberg (DE)

(72) Inventors: Olaf Baumeister, Sundern (DE);
Michael Franke, Sundern (DE)

(73) Assignee: BJB GmbH & Co. KG, Arnsberg (DE)

( * ) Notice: Subject to any disclaimer, the term of this patent is extended or adjusted under 35 U.S.C. 154(b) by 43 days.

(21) Appl. No.: 15/946,836

(22) Filed: Apr. 6, 2018

(65) Prior Publication Data

US 2018/0231036 A1 Aug. 16, 2018

Related U.S. Application Data

(63) Continuation of application No. PCT/EP2016/063709, filed on Jun. 15, 2016.

(30) Foreign Application Priority Data

Oct. 6, 2015 (DE) ................. 10 2015 117 007

(51) Int. Cl.
| | |
|---|---|
| *F16B 2/24* | (2006.01) |
| *F16B 21/08* | (2006.01) |
| *F21V 19/00* | (2006.01) |
| *F16B 5/06* | (2006.01) |
| *F16B 43/00* | (2006.01) |

(52) U.S. Cl.
CPC ............ *F16B 2/243* (2013.01); *F16B 21/086* (2013.01); *F21V 19/004* (2013.01); *F16B 5/0642* (2013.01); *F16B 43/00* (2013.01); *F16B 43/003* (2013.01)

(58) Field of Classification Search
CPC ............ Y10T 24/44026; Y10T 24/304; Y10T 24/306; Y10T 24/307; F16B 2/243; F16B 21/086; F16B 43/003; F16B 43/00; F21V 19/004
See application file for complete search history.

(56) References Cited

U.S. PATENT DOCUMENTS

| | | | |
|---|---|---|---|
| 2004/0052575 A1 | 3/2004 | Draggoo et al. | |
| 2011/0116890 A1 | 5/2011 | Okada et al. | |
| 2011/0232049 A1* | 9/2011 | Ribes Marti | B60R 21/213 24/458 |

(Continued)

FOREIGN PATENT DOCUMENTS

| | | |
|---|---|---|
| DE | 102013214236 A1 | 11/2009 |
| DE | 102007042484 B3 | 11/2010 |
| DE | 102010035012 A1 | 2/2012 |

(Continued)

*Primary Examiner* — Robert Sandy
(74) *Attorney, Agent, or Firm* — Von Rohrscheidt Patents

(57) ABSTRACT

A fastening element for fastening two components at one another, wherein a first component includes cut out and a second component includes a recess, wherein the fastening element penetrates the cut out and is seated in the recess to fasten a LED circuit board on a lamp component and includes a retaining clamp, wherein the retaining clamp forms a shaft wherein a shaft head is arranged at one end of the shaft, wherein the retaining clamp includes a clamping element that is arranged at the shaft head wherein the retaining clamp is provided with at least one retaining element which is configured to support the shaft in the recess of the second component wherein the fastening element includes a mounting plate in which the retaining clamp is retained in a preassembled state.

10 Claims, 6 Drawing Sheets

(56) References Cited

U.S. PATENT DOCUMENTS

2014/0250643 A1    9/2014   Kamiya et al.
2015/0026934 A1*   1/2015   Johnson .................... F16B 5/06
                                                                              24/458

FOREIGN PATENT DOCUMENTS

| | | |
|---|---|---|
| DE | 102013014161 A1 | 2/2015 |
| EP | 0822624 A1 | 2/1998 |
| EP | 1630426 A2 | 3/2006 |
| EP | 2354569 A2 | 8/2011 |
| FR | 2933888 A1 | 1/2010 |
| JP | H0716014 U | 3/1995 |
| WO | WO2007025687 A1 | 3/2007 |
| WO | WO2010101803 A1 | 9/2010 |
| WO | WO2015007277 A2 | 1/2015 |

* cited by examiner

FASTENING ELEMENT

RELATED APPLICATIONS

This application is a continuation of International Patent Application PCT/EP2016/063709 filed on Jun. 15, 2016 claiming priority from German Patent Application DE 10 2015 117 007.8 filed on Oct. 6, 2015, both of which are incorporated in their entirety by this reference.

FIELD OF THE INVENTION

The invention relates to a fastening element for fastening two components at one another.

BACKGROUND OF THE INVENTION

Fastening elements of the general type recited supra are disclosed in various embodiments in WO 2015/007277 A2 owned by applicant. They are used for fastening two components at each other wherein the invention is directed to the lamp industry, this means production and assembly of lamps for room and building illumination or for external illumination. In this field LED illuminants increasingly replace convention iridescent and gas discharge lamps. LEDs are typically arranged on circuit boards that are provided with conductive paths and connections for wiring. Furthermore the circuit boards of more complex illuminants also include control and regulation components. A unit of this type including a LED and a circuit board is also designated as LED unit or simply LED and is placed onto a lamp element which is typically not only used for support but also for heat dissipation.

The increasing popularity of LED illuminants requires automated fabrication methods for which the fastening devices currently used, e.g. bolts are less suitable.

The fastening devices known in the art use cut outs in the circuit boards and lamp components and recesses for bolt attachment in order to facilitate interlocking or spread rivet type fastening elements, in any case insertable fastening elements to facilitate the attachment of the LED illuminant at the lamp element.

A contact pressure between the LED circuit board and the heat dissipating lamp component is particularly significant. The contact pressure has to be defined within a particular band width in order to provide an optimum heat dissipation and thus an optimum service life of the LED. Therefore clamping the LED circuit board and the lamp component together is very important. In addition to correct contact pressure the clamping elements of the fastening elements also compensate fabrication tolerances.

At first glance there are certain commonalities between fastening devices for fastening LED illuminants and similar fastening devices for automotive applications. In fact the fastening devices for fixing LED illuminants require much smaller structures, thus the attachment devices of WO 2015/007277 A2 have a maximum length of 7 mmm and a maximum width of 5 mm and are thus much smaller than the non-related art in the automotive industry.

The fastening elements from the related art by applicant recited supra have proven very successful in practical applications. Still mounting LED illuminants and handling the associated fastening elements shall be further simplified.

BRIEF SUMMARY OF THE INVENTION

Thus, it is an object to provide a new fastening device for fastening two components at each other, in particular for fastening a LED circuit board at a lamp element wherein the fastening device can be integrated into the production and assembly process more easily.

The object according to the invention is achieved by A fastening element for fastening a LED circuit board at a lamp component, wherein the LED circuit board includes cut out and the lamp component includes a recess, wherein the fastening element penetrates the cut out and is seated in the recess to fasten the LED circuit board on the lamp component and includes a retaining clamp, wherein the retaining clamp forms a shaft wherein a shaft head is arranged at one end of the shaft, wherein the retaining clamp includes a clamping element that is arranged at the shaft head, wherein the retaining clamp is provided with at least one retaining element which is configured to support the shaft in the recess of the lamp component, wherein the fastening element includes a mounting plate in which the retaining clamp is retained in a preassembled state of the fastening element.

Using a mounting plate in which the support clamp of the attachment device is arranged in a preassembled configuration simplifies receiving the fastening devices in assembly robots and thus facilitates an improved preassembly on the LED circuit board.

In particular for preassembling on the LED circuit board it is provided that the bottom side of the mounting plate that is oriented away from the shaft head is provided with an adhesion enhancement agent, in particular with a soldering agent coating by which the mounting plate is fixable on the surface of the first component. The adhesion enhancement agent according to the invention can be a glue, however it is particularly advantageously when the preassembly of the fastening device can be integrated into the automatic stuffing of the LED circuit board with electronic components. Therefore it is proposed in particular to provide the mounting plate at its back side that is oriented away from the shaft head with a suitable soldering agent coating, e.g. with soldering tin. Thus, the mounting plate supporting the fastening device can be soldered onto the circuit board like the remaining electronic components so that an intermediate process step of the attachment device preassembly can omitted in the future. Additionally separate stuffing robots that were required so far can be omitted since the fastening device according to the invention can be applied to the circuit board by the robots that are already being used for stuffing the electronic components.

In order to provide a secure and defined position of the attachment device in the cut out of the LED circuit board it is provided that the mounting plate includes at least one centering arm which is configured to engage the cut out in the first component.

The mounting plate is configured to form a contact surface for the clamping element.

The essential advantage is that surface properties of the circuit board are irrelevant for forming the clamping element. For example when the spring elastic arms are used as clamping elements like in an advantageous embodiment larger configurative adaptations can be omitted to prevent damaging of the circuit board surface.

It is provided that the clamping element is formed by at least one spring arm which extends from the shaft head.

Thus it is being considered that the spring arm is run under the shaft head.

It is particularly advantageous when two spring arms originate from the shaft head which receive the shaft between each other. In this embodiment a particularly uniform contact force is provided.

This is improved even more when the spring arms come out of the shaft head in opposite directions and are run below the shaft head in opposite directions.

It is provided that the spring arm is supported with its free end on the mounting plate in a sliding manner.

Eventually it is provided that the support element of the shaft is configured as an interlocking spring which interlocks in preassembled condition at the centering arm of the mounting plate.

BRIEF DESCRPTION OF THE DRAWINGS

Further advantages of the invention can be derived from the subsequent description of an embodiment with reference to a drawing figure, wherein.

DETAILED DESCRPTION OF THE INVENTION

Figure 1:
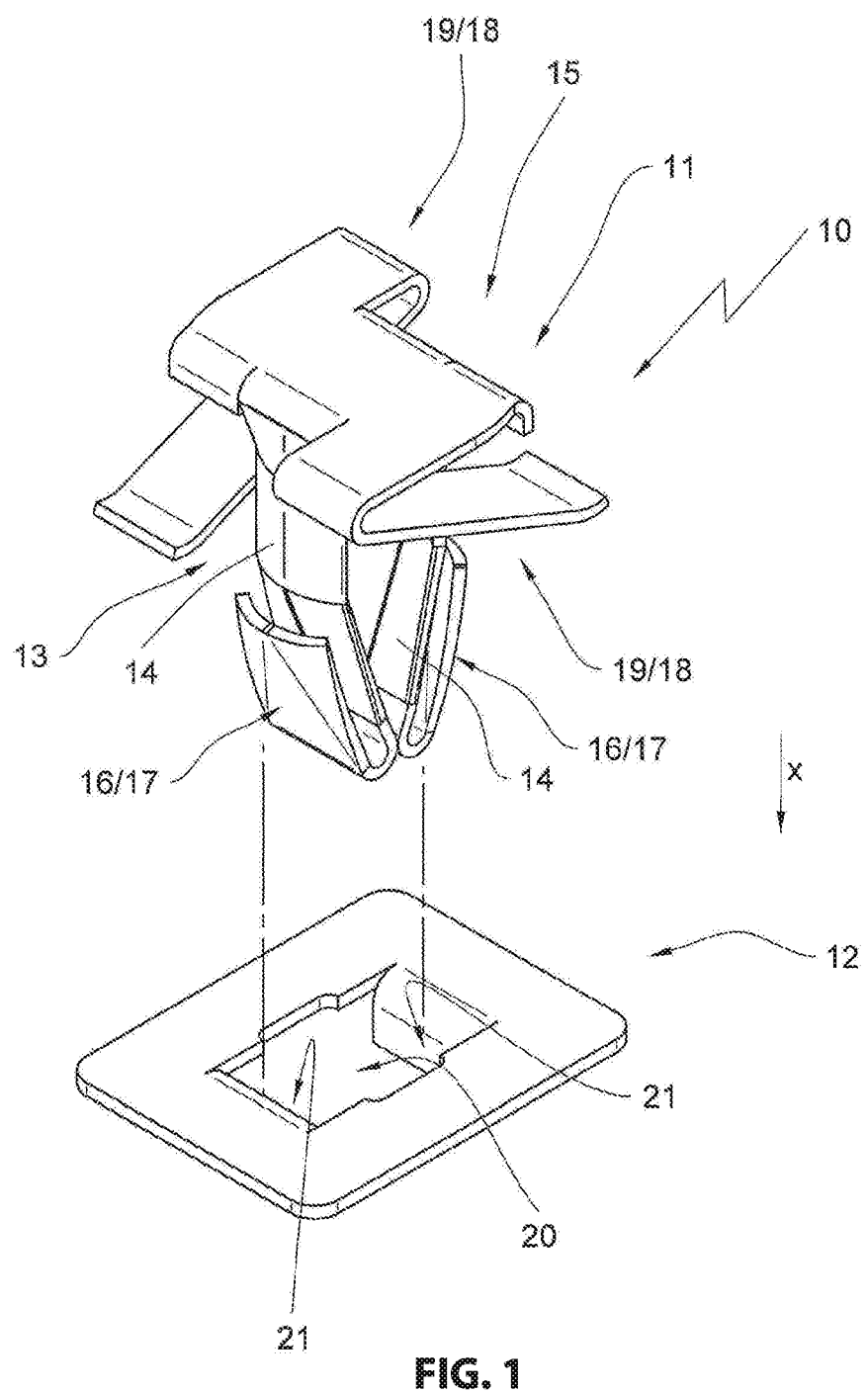
FIG. 1 illustrates a fastening element according to the invention with a retaining clamp and a mounting plate in an exploded view.

In the drawing figures a fastening element is designated overall with the reference numeral 10.

The fastening element 10 includes a retaining clamp 11 and a mounting plate 12.

The retaining clamp 11 includes a shaft 13. The shaft is formed by two shaft lobes 14 which originate from a shaft head 15. Each shaft lobe 14 carries a retaining element 16 at its free end, wherein the retaining element is configured as a retaining spring and obtained by bending an end section of each shaft lobe 14 against an insertion direction x. Free ends of the shaft lobe 14 contact each other and support each other in the portion of the interlocking spring 17 that is obtained by bending the shaft lobes over.

The shaft head 15 is oriented essentially horizontal to a shaft longitudinal axis. Two clamping elements 18 configured as spring arms 19 originate from the shaft head. The spring arms 19 receive the shaft 13 between each other and are oriented in an opposite direction relative to their origin in the shaft head 15 and run under the shaft head 15. Since the spring arms 19 originate from the shaft head 15 in opposite directions they are also run under the shaft head 15 respectively in opposite directions so that a cross over arrangement of the spring arms 19 is obtained in the side view of FIG. 2.

The mounting plate 12 includes a receiving opening 20 into which the retaining clamp 11 is insertable with a free end of the shaft 13 in an insertion direction x. Two opposite centering arms 21 are formed by the mounting plate 12 and engage the receiving opening 20. The centering arms 21 are arranged parallel to the shaft longitudinal axis, angled out of the plane of the mounting plate 12 and oriented away from the clamping head.

Figure 2:
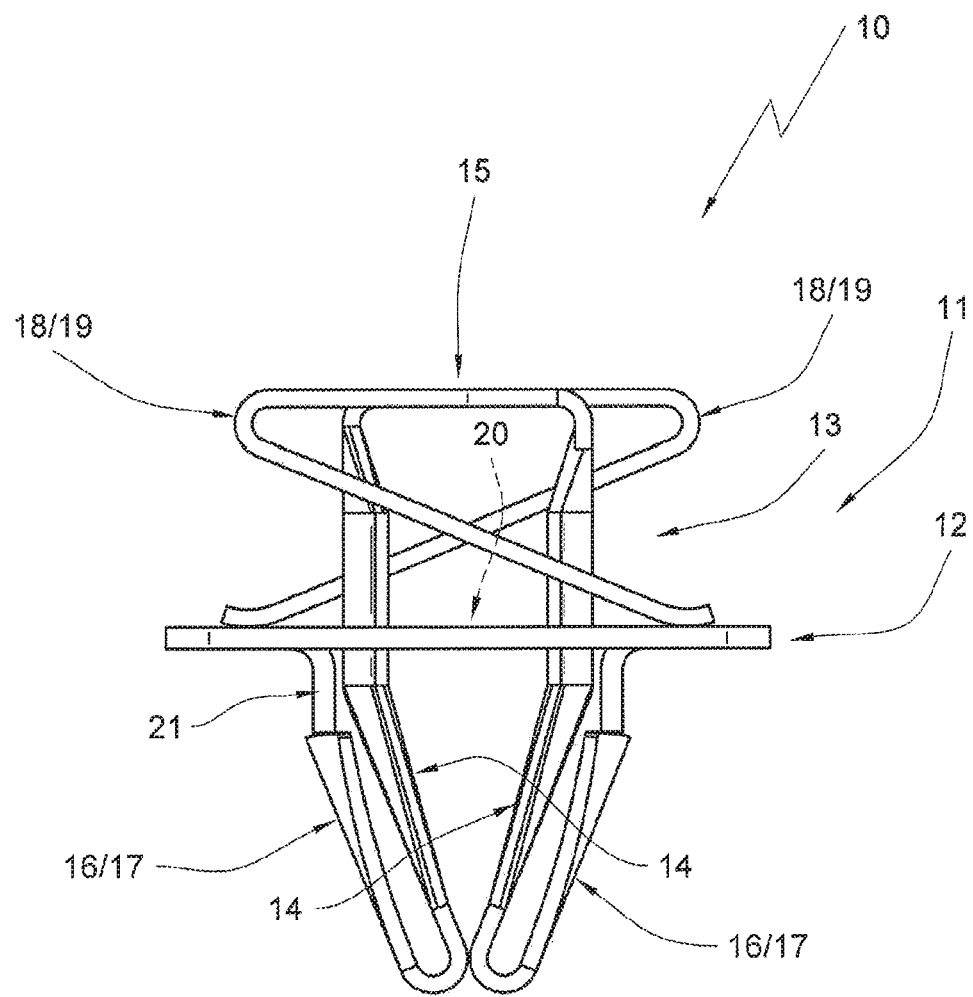
FIG. 2 illustrates the fastening element according to FIG. 1 in a side view.

Looking at FIG. 2 which illustrates the retaining clamp 11 that is preassembled in the mounting plate 12 it is evident that the interlocking springs 17 of the shafts 13 interlock at the centering arms 21 which are angled with respect to the shaft head 15 in downward direction from the mounting plate 12. Thus, faces of the interlocking springs 17 contact faces of the centering arms 21.

Figure 5:
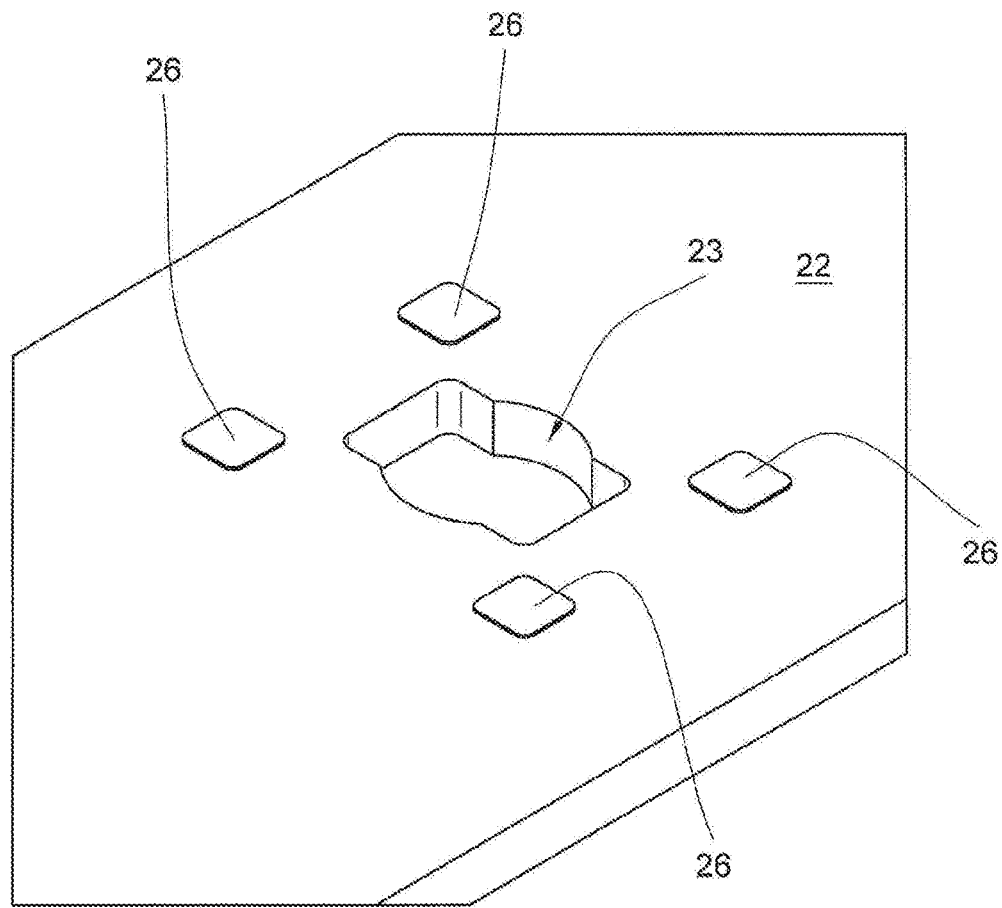
FIG. 5 illustrates a schematic LED circuit board.
Figure 6:
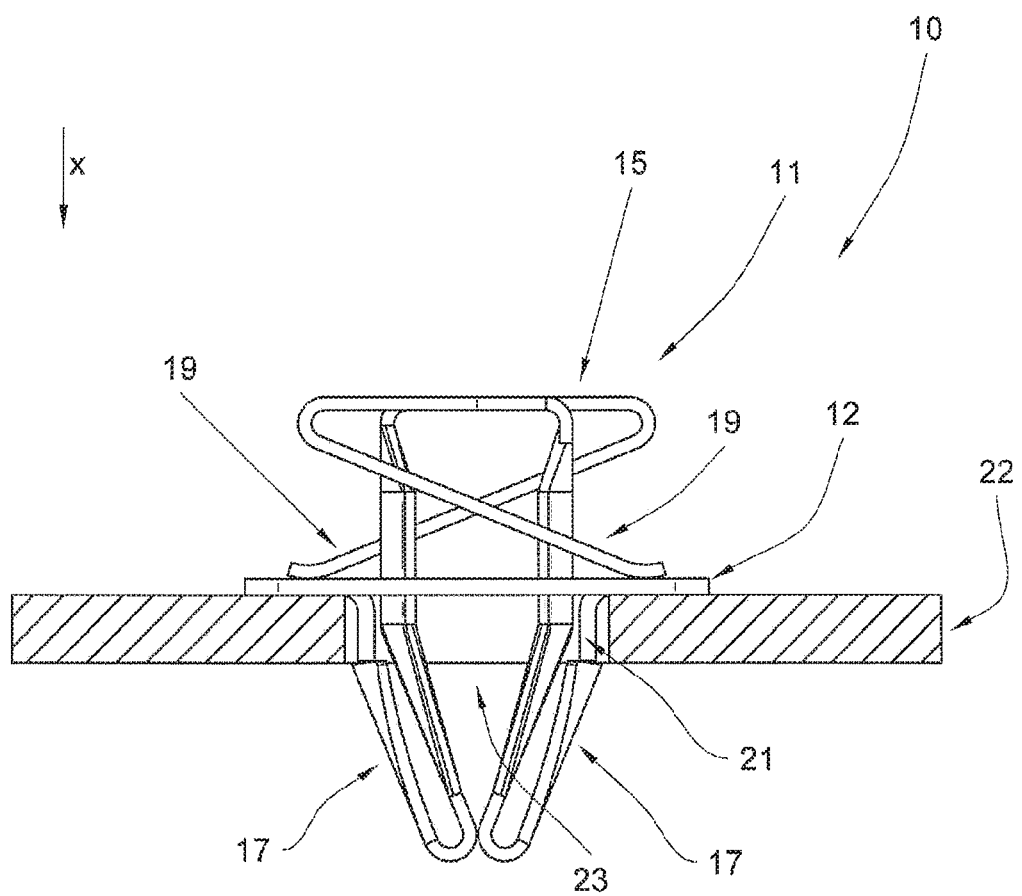
FIG. 6 illustrates mounting the fastening element according to the invention according to FIG. 2 on the circuit board according to FIG. 5.

FIG. 5 illustrates a first component 22 which includes a cutout 23. This is a LED circuit board in a particular embodiment on which electronic components and in particular the LEDs are arranged and connected with each other by conductive paths in order to supply voltage. Soldering fields 26 are arranged about the pass through opening 23 in order to attach the mounting plate 12 at this location, FIG. 6 illustrates the fastening element 10 that is preassembled on the LED circuit board 22. The mounting plate 12 which is provided with an adhesion enhancement agent on a bottom side which is oriented away from the shaft head 15, in the instant embodiment a soldering agent, for example soldering tin, is placed onto the LED circuit board 22, wherein the centering arms 21 engage the cut out 23. Thus, a precisely positioned arrangement of the fastening element 10 is provided on the LED circuit board 22. By arranging the mounting plate 12 on the LED circuit board 22 a support clamp 11 that is preassembled in the mounting plate 12 is fixed at the LED circuit board 22 ready for assembly. The attachment of the mounting plate 12 at the LED circuit board 22 is advantageously provided by soldering. Thus soldering tin on the mounting plate and optionally also soldering tin on the soldering fields 26 is heated and bonds together which fixes the fastening element 10 on the LED circuit board 22 when the solder cools down.

The spring arms 19 of the retaining clamp 11 contact the top side of the mounting plate 12 which is oriented towards the shaft head 15. The spring arms 19 are slideably supported at this location.

Figure 3:
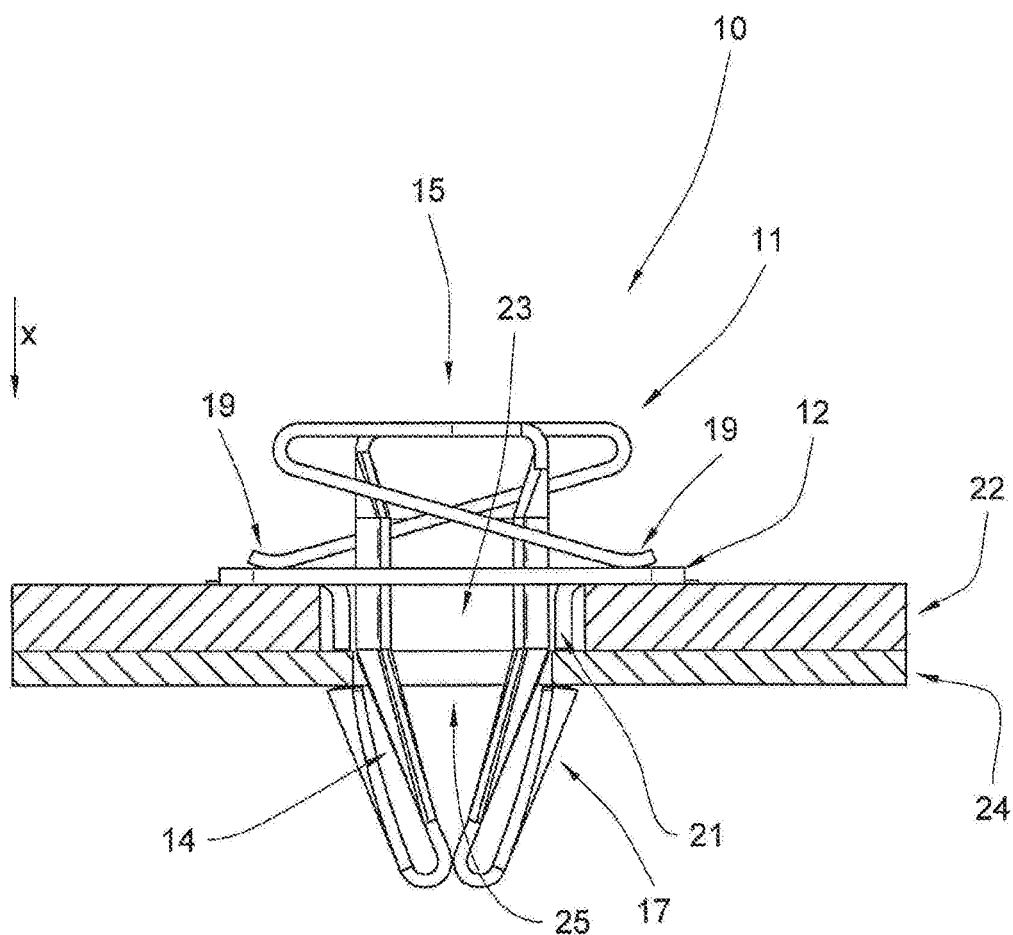
FIG. 3 illustrates the fastening element according to FIG. 2 in a first mounting configuration.

In a first mounting situation that is illustrated in FIG. 3 the LED circuit board 12 is placed on a second component 24 which includes a recess 25 and which is advantageously configured as a cooling element or a mounting plate of a lamp. The recess 25 is produced as a material penetrating bore hole in the illustrated embodiments. However, it is also conceivable that the recess 25 is a dead hole in the instant embodiment wherein the dead hole also represents a recess.

In order to arrange the LED circuit board 22 on the lamp element 24 the cut out 23 and the recess 25 are aligned with each other. The shaft lobes 14 of the retaining clamp 11 penetrate the recess 25. The recess 25 has a smaller diameter than a distance between inner surfaces of the interlocking springs 17 so that the interlocking springs reach behind a bottom side of the lamp element 24 in the illustrated embodiment after passing through the recess 25 so that the interlocking springs are interlocked at the bottom side of the lamp element 24. Thus, the retaining clamp 11 has to be moved in insertion direction x which is facilitated by respective pressure loading of the shaft head 15. Thus, the spring arms 19 of the shaft head 15 are displaced in a spring elastic manner and load the mounting plate 12 and thus the components 22 and 24 that are supported at the interlocking spring 17 are loaded with a contact force.

This way a defined contact pressure can be established between the LED circuit board 22 and the lamp element 24 wherein the contact pressure facilitates a controlled heat dissipation.

Figure 4:
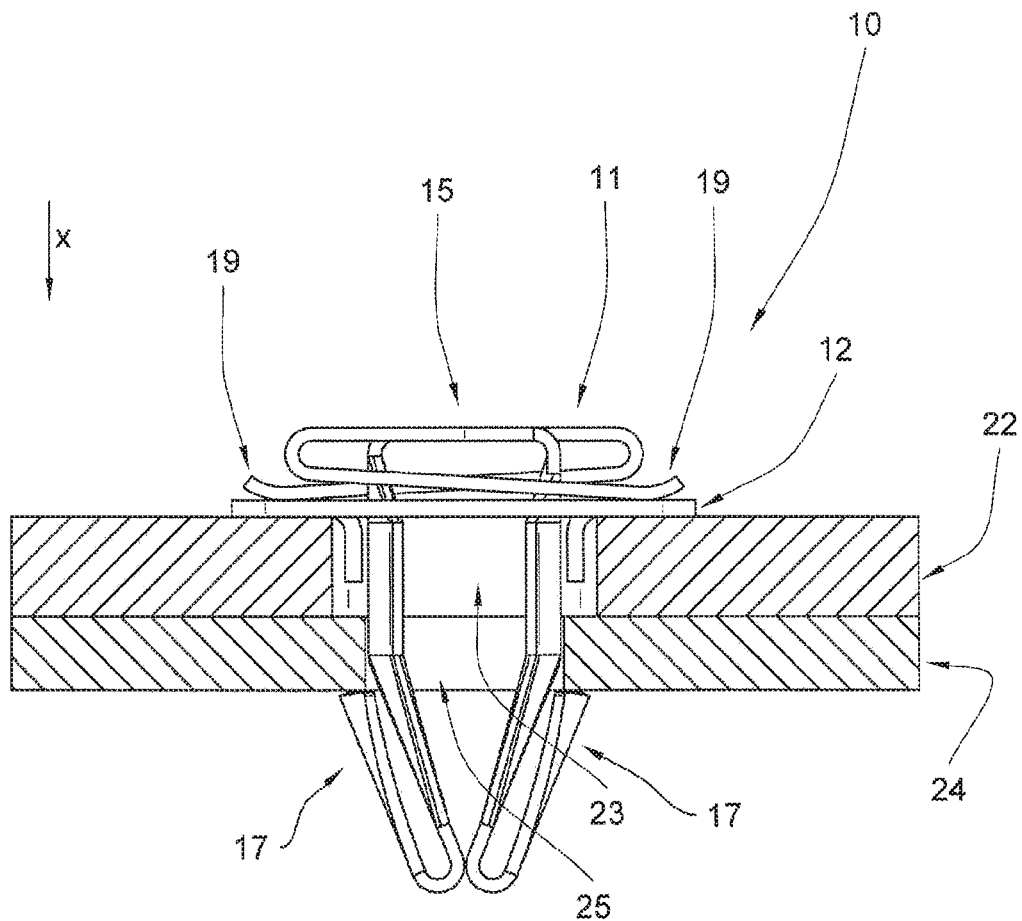
FIG. 4 illustrates a mounting configuration that differs from FIG. 3.

FIG. 4 illustrates a mounting situation of the fastening element 10 that differs from the FIG. 3. A material thickness of the LED circuit board 22 and the light element 24 is larger, caused e.g. by fabrication tolerances. Through the large spring travel which is facilitated by a particular configuration of the spring arms 19 used for a clamping element 18 even large material tolerances can be compensated in that an insertion travel in insertion direction x of the retaining clamp 11 is increased accordingly. The contact forces applied to the components 12, 22, 24 are larger accordingly which, however, does not prevent good heat dissipation.

Thus, a fastening element 10 is presented which is suitable in particular to fix a LED circuit board 22 at a light element 24. By adding a mounting plate 12 to the retaining clamp 11 a preassembly of the fastening element 10 can be performed on the LED circuit board 22 that is being stuffed with electrical components. Additionally it is an object of the mounting plate 12 to function as a support for the spring arms 19 which act as clamping elements 19 and control a contact pressure between the LED circuit board 22 and the lamp element 24. This way the spring arms 19 can be configured in an optimum manner with respect to their purpose, thus applying contact forces since the circuit board surface cannot be damaged.

The instant configuration of the spring arms 19 as components that are run below the head 15 facilitates large spring travel and thus a large insertion travel of the retaining clamp 11 so that substantial material tolerances can be compensated.

REFERENCE NUMERALS AND DESIGNATIONS 10 fastening element
11 retaining clamp
12 mounting plate
13 shaft
14 shaft lobe
15 shaft head
16 retaining element
17 interlocking spring
18 clamping element
19 spring arm
20 receiving opening
21 centering arm
22 first component
23 cut out
24 second component
25 recess
26 soldering field
x insertion direction

What is claimed is:

1. A fastening element for fastening a LED circuit board at a lamp component,
wherein the LED circuit board includes a cut out and the lamp component includes a recess,
wherein the fastening element penetrates the cut out and is seated in the recess to fasten the LED circuit board on the lamp component and includes a retaining clamp,
wherein the retaining clamp forms a shaft wherein a shaft head is arranged at one end of the shaft,
wherein the retaining clamp includes a clamping element that is arranged at the shaft head,
wherein the retaining clamp is provided with at least one retaining element which is configured to support the shaft in the recess of the lamp component,
wherein the fastening element includes a mounting plate in which the retaining clamp is retained in a preassembled state of the fastening element.

2. The fastening element according to claim 1, wherein the mounting plate includes at least one centering arm which is configured to engage the cut out of the LED circuit board.

3. The fastening element according to claim 1, wherein the mounting plate forms a contact surface for the clamping element.

4. The fastening element according to claim 1, wherein a bottom side of the mounting plate that is oriented away from the shaft head is provided with an adhesion enhancement agent or with a solder coating by which the mounting plate is fixable at a surface of the LED circuit board.

5. The fastening element according to claim 1, wherein the clamping element is formed by at least one spring arm which originates from the shaft head.

6. The fastening element according to claim 5, wherein the spring arm is run under the shaft head.

7. The fastening element according to claim 5, wherein two spring arms originate from the shaft head and receive the shaft between each other.

8. The fastening element according to claim 7, wherein the two spring arms originate from the shaft head in opposite directions and are run in opposite directions under the shaft head.

9. The fastening element according to claim 5, wherein the spring arm is supported with its free end in a sliding manner on the mounting plate.

10. The fastening element according to claim 2, wherein the at least one retaining element of the shaft is configured as an interlocking spring which interlocks in a preassembled condition at a centering arm of the mounting plate.

* * * * *